US007240279B1

(12) United States Patent
Chartier et al.

(10) Patent No.: US 7,240,279 B1
(45) Date of Patent: Jul. 3, 2007

(54) XML PATTERNS LANGUAGE

(75) Inventors: Daniel Philip Chartier, Redmond, WA (US); Lou Nell Gerard, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 637 days.

(21) Appl. No.: 10/176,143

(22) Filed: Jun. 19, 2002

(51) Int. Cl.
*G06F 17/00* (2006.01)
*G06F 9/45* (2006.01)
*G06F 7/00* (2006.01)

(52) U.S. Cl. ............. 715/513; 715/530; 707/100; 717/143

(58) Field of Classification Search ......... 715/513, 715/500, 517, 530; 707/3, 6, 100, 1; 717/143
See application file for complete search history.

(56) References Cited

U.S. PATENT DOCUMENTS

| | | | |
|---|---|---|---|
| 2002/0103914 A1* | 8/2002 | Dutta et al. ................ | 709/229 |
| 2002/0156799 A1* | 10/2002 | Markel et al. .............. | 707/202 |
| 2003/0187724 A1* | 10/2003 | Litwiller et al. ............ | 705/11 |
| 2004/0148568 A1* | 7/2004 | Springer ..................... | 715/513 |
| 2005/0114148 A1* | 5/2005 | Hinkelman .................. | 705/1 |
| 2005/0160065 A1* | 7/2005 | Seeman ....................... | 707/1 |

OTHER PUBLICATIONS

"Schematron: validating XML using XSL", Apr. 2001, pp. 1-18, http://www.ldodds.com/papers/schematron_xsltuk.html.*
Jelliffe, Rick. "The Schematron: An XML Structure Validation Language using Patters in Trees", pp. 1, Nov. 2, 1999.*
Carlisle, David. "Schemtron Report", Nov. 2, 1999, pp. 1-3, http://xml.ascc.net/resource/schematron/DavidCarlisle/schematron-frame.html.*
Jelliffe, Rick. "The Schematron: An XML Structure Validation Language using Patterns in Trees." Academia Sinica Computing Centre. n.d. 1pg. Available: http://www.ascc.net/xml/resource. schematron/WAI-example.html, Nov. 2, 1999.
Jelliffe, Rick. "The Schematron: An XML Structure Validation Language using Patterns in Trees." Academia Sinica Computing Centre. 1999-2001. 6pp. Available: http://www.ascc.net/xml/resource/schematron/schematron.html.
Jelliffe, Rick. "Schematron schema for WAI." Academia Sinica Computing Centre. n.d.. 4pp. Available: http://www.ascc.net/xml/resource/schematron/wai.xml, Dec. 31, 1999.

* cited by examiner

*Primary Examiner*—Stephen Hong
*Assistant Examiner*—Adam L Basehoar
(74) *Attorney, Agent, or Firm*—Merchant & Gould

(57) ABSTRACT

Evaluating a source document for compliance with a rule set that represents contextual guidelines to which the source document must conform. The rule set comprises a rule node that includes a context that is compared to the source document to identify candidate nodes for further evaluation. Each rule node also includes a descendant pattern node that includes a pattern matching expression representing at least one aspect of the contextual guidelines to which the source document must conform. Preferably a match between a candidate node and the pattern matching expression indicates a nonconformance to the contextual guideline(s), and a predefined action is initiated. Predefined actions include reporting the nonconformance, and automatically repairing the nonconformance through script code.

24 Claims, 6 Drawing Sheets

XML PATTERNS LANGUAGE

FIELD OF THE INVENTION

This invention generally relates to analyzing markup documents for compliance with contextual guidelines, and more particularly, to reporting and repairing noncompliant markup grammar based on loosely defined contextual rules.

BACKGROUND OF THE INVENTION

Contextual guidelines are typically developed to improve usability and ensure consistency of locations, products, and services. For example, the Americans with Disabilities Act (ADA) was enacted in part to improve access to commercial buildings for people with disabilities through a set of consistent regulations that affect building codes. The ADA also includes a Section 508 directed to accessibility of electronic and information technology. Sub-part 1194.22 a-p of Section 508 addresses accessibility of Web content. A portion of this sub-part is also addressed by the World Wide Web Consortium (W3C) Web Content Accessibility Guidelines (WCAG), which are intended to improve access to information in Web pages through a set of consistent guidelines for creating the Web pages. For example, the guidelines suggest providing a text alternative to an audio element of a Web page whenever possible, so that deaf people can read the content of the audio element. In general, the WCAG provides a set of guidelines that describe principles of accessible design. Each guideline includes a number of checkpoints that explain how the guideline applies in typical content development scenarios. The checkpoints are sufficiently specific so that someone reviewing a Web page or Web site may verify that each checkpoint has been satisfied.

The guidelines and checkpoints of the WCAG are comprehensible by humans who design Web pages and who review the Web pages for conformance to the guidelines and checkpoints. However, it would be desirable to enable automatic review of Web pages for conformance, and to enable automatic design corrections when nonconformances are identified. Unfortunately, the guidelines and checkpoints include some assertions that are abstract, and not well suited to traditional automation techniques. For example, one of the checkpoints includes a requirement that a developer "use the clearest and simplest language appropriate for a site's content." With traditional automation techniques, it is difficult to determine whether the "clearest" and "simplest" language that is "appropriate" for a site has been used.

There are a number of programming methodologies to ensure that a source document satisfies formatting, structural, and other constraints. In general, a program can evaluate grammar in the source document to detect one or more patterns. When a predetermined pattern is detected, a corresponding predetermined action is taken in relation to the pattern. Often this pattern detection is implemented using software written in a standard programming language, such as C. A programming language is versatile for writing customized program code that can detect the predefined patterns and accomplish the predefined actions. Program code can also report detection of a pattern (or lack of a pattern), so that a human can intervene in cases of vague guidelines. However, it is difficult to update and maintain program code. Also, customized program code is often difficult to reuse for evaluating and correcting a wide variety of source documents.

Another approach in evaluating a source document for compliance to the guidelines and checkpoints is to define a schema. A schema defines a framework to which a source document must conform. Thus, a schema can be used to validate the structure, order, and values of elements and attributes in source documents. However, schemas require that the structure of the entire document be defined. Also, schemas must validate against the grammar of the source document, not against a contextual guideline. Further, there are no implicit mechanisms for simply reporting violations of vague guidelines that may require some human intervention.

A modified schema approach, called SCHEMATRON, was developed by Academia Sinica Computing Centre of the Republic of China (Taiwan), and is based on tree patterns in a source document rather than the grammar of the source document. SCHEMATRON is a structure validation language that utilizes an eXtensible Markup Language (XML) open schema to confirm whether a source eXtensible Hypertext Markup Language (XHTML) document conforms to the schema. In general, SCHEMATRON provides a few unique elements that simplify the use of XPath expressions. As an example, online documentation for SCHEMATRON (at the following web page on the world wide web: ascc.net/xml/resource/schematron/WAI-example) illustrates a sample schema that confirms whether a source XHTML document conforms to the W3C WCAG. The schema includes "rule" expressions for matching an XPath context attribute in a source XHTML document. Upon a match, the schema provides "assert" expressions that contain error statements indicating each specific nonconformance with the accessibility guidelines.

However, careful evaluation reveals that SCHEMATRON uses an inefficient process to accomplish its task. Specifically, SCHEMATRON first requires an eXtensible Stylesheet Language (XSL) document to transform the schema into an intermediate XSL document. The intermediate XSL document is then applied to the source XHTML document to execute XPath expressions that evaluate the source XHTML document and produce the error statements. In addition to being complex, SCHEMATRON does not provide any means to mechanically repair nonconforming source XHTML documents. Repairs must be implemented by manually editing the nonconforming source XHTML document based on the error statements. Further, SCHEMATRON is limited to processing XHTML source documents. It would therefore be desirable to provide a more efficient technique for evaluating any source document for conformance to a set of contextual guidelines. It is further desirable to provide summary and detailed reports that are organized by categories for a user to analyze and correct problems manually if desired. However, the technique should also enable mechanical or automated correction of any nonconforming portion of the source document that is identified.

SUMMARY OF THE INVENTION

The present invention provides an efficient method and system for evaluating a source document for compliance with a rule set that represents contextual guidelines to which the source document must conform. The rule set provides at least one rule node that includes a context value that is compared to nodes of the source document to identify candidate nodes in the source document that should be further evaluated for conformance to the contextual guidelines. Each rule node also includes at least one descendant pattern node that includes a pattern matching expression representing at least one aspect of the contextual guidelines to which the source document must conform. The pattern matching expression may represent one or more components of an abstract contextual guideline, may represent an entire contextual guideline, or may represent a combination of simple grammatical contextual guidelines. The pattern matching expression is compared to the candidate nodes to determine which candidate nodes match the pattern matching expression. Preferably a match indicates a nonconformance to the contextual guideline(s), and a predefined action is initiated. Predefined actions include reporting the nonconformance, generating repair code that enables a user to mechanically repair the nonconformance, or automatically repairing the nonconformance.

In a preferred embodiment, a Markup Analysis Processor (MAP) can evaluate any Hypertext Markup Language (HTML) source document for nonconformances to any XML rule set. The context of each rule node and the pattern matching expression of each pattern node may comprise an XPath expression, an XSL Transformations (XSLT) pattern, or other expression of a pattern matching language. A nonconformance determined through matching an expression can be reported via a report node that is a descendant of the matching pattern node. The report node may comprise message text, may point to a message, or may otherwise provide a message. In addition, or alternatively, the pattern node may include a descendant repair node. The repair node may comprise code, such as script code, or otherwise provide a process for correcting a nonconformance.

Another aspect of the invention is a method for specifying a rule set representing contextual guidelines to which a source document must conform. As suggested above, a rule set is specified by defining at least one rule node that includes a context to identify a related candidate node of the source document. A rule set is further specified by defining at least one pattern node for each rule node, wherein each pattern node includes a pattern that expresses a requirement to which the related candidate node must comply, in order for the source document to conform to the contextual guidelines. A further aspect of the invention is a computer-readable memory storing a data structure comprising at least one rule node that includes a context to identify a related candidate node of the source document. The data structure further includes at least one pattern node for each rule node, wherein each pattern node includes a pattern specifying a requirement to which the identified candidate node must comply, in order for the source document to conform to the contextual guidelines.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
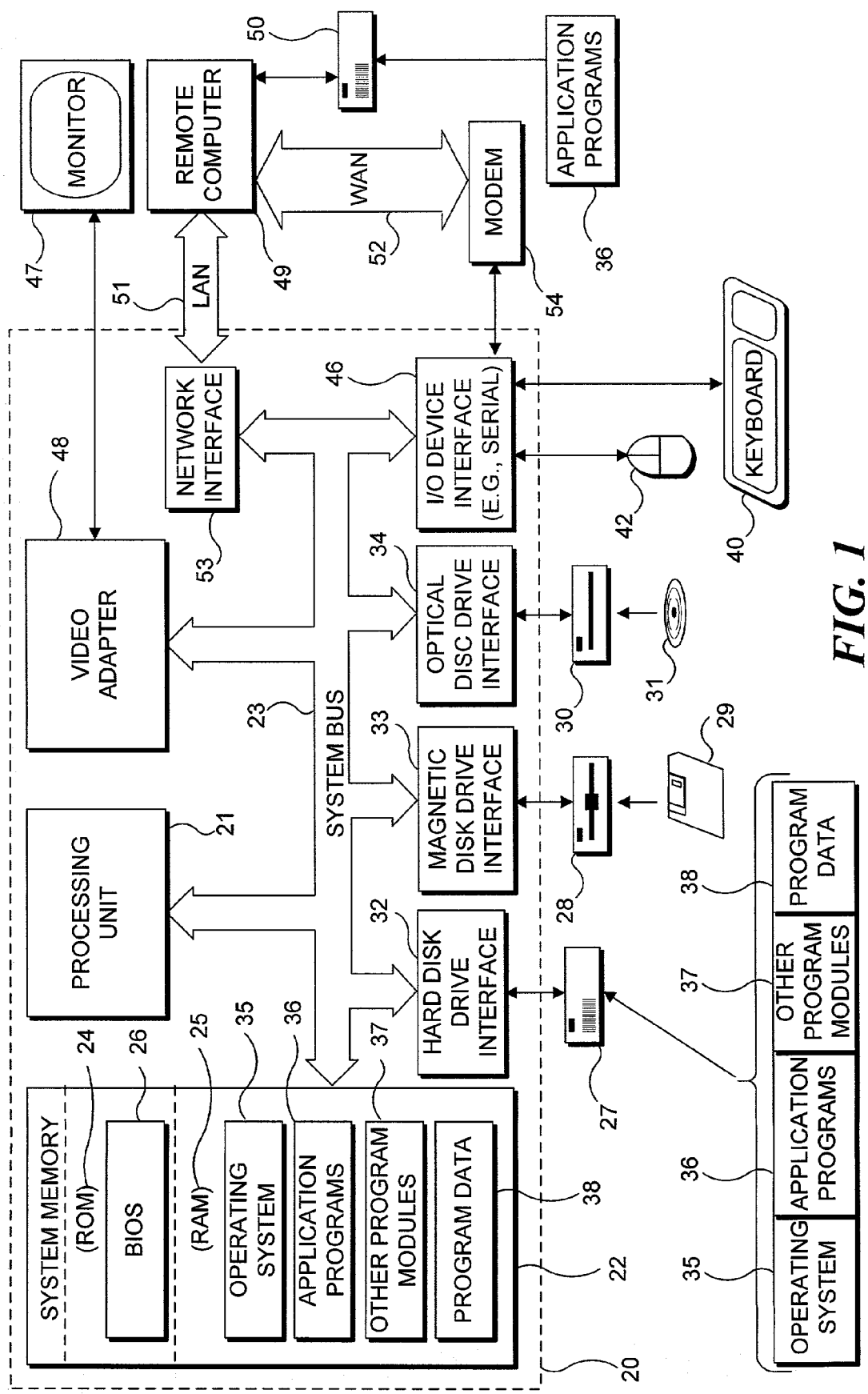
FIG. 1 is a block diagram of an exemplary system for implementing the present invention, using a general purpose computing device in the form of a conventional personal computer (PC)

FIG. 1 and the following discussion are intended to provide a brief, general description of a suitable computing environment in which the present invention may be implemented. The invention may be practiced on a single computing device, but can also be practiced on a client computing device coupled in communication with a server and/or one or more other remote computing devices over a communication network. Both the client computing device and the server will typically each include the functional components shown in FIG. 1. Although not required, the present invention will be described in the general context of computer executable instructions, such as program modules, which are executed by a PC. Generally, program modules include application programs, such as computer simulations, routines, objects, components, functions, data structures, etc. that perform particular tasks or implement particular abstract data types. Also, those skilled in the art will appreciate that this invention may be practiced with other computer system configurations, particularly in distributed computing environments, where tasks are performed by remote processing devices that are linked through a communications network. In a distributed computing environment, program modules may be located in either or both local and remote memory storage devices.

With reference to FIG. 1, an exemplary system for implementing the present invention includes a general purpose computing device in the form of a conventional PC 20, which is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disc 29, and an optical disk drive 30 for reading from or writing to a removable optical disc 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disc 29, and removable optical disc 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disc 29, optical disc 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information. In addition to the monitor, PCs are often coupled to other peripheral output devices (not shown), such as speakers (through a sound card or other audio interface (not shown)) and printers.

As indicated above, the invention may be practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Embodiment

A preferred embodiment of the present invention comprises a Web editor, such as Microsoft Corporation's FRONTPAGE™ Web editor. In this exemplary embodiment, the invention expands underlying capabilities of previous versions of the Web editor. The Web editor provides a WYSIWYG user interface for developing, publishing, and maintaining Web sites.

Figure 2:
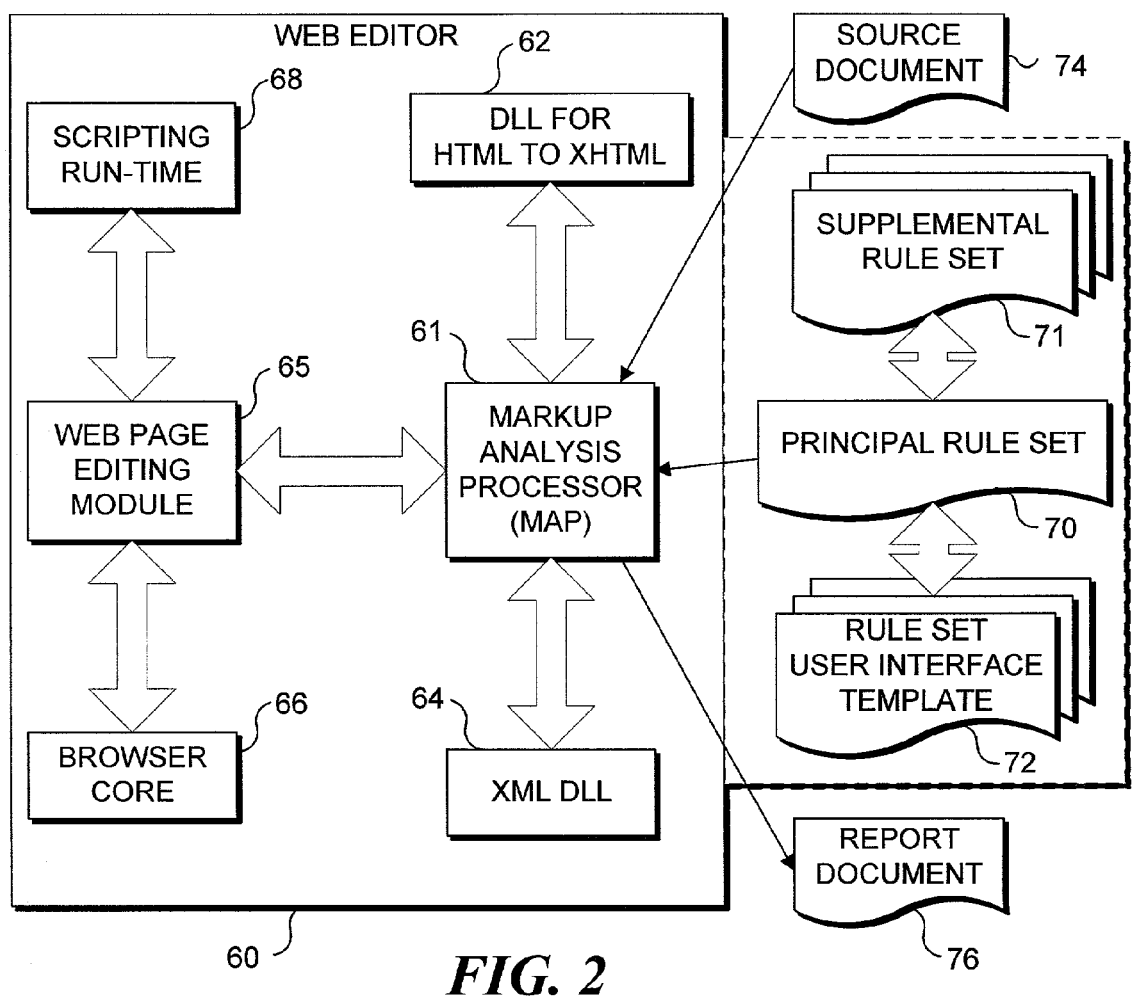
FIG. 2 is a block diagram illustrating an architecture of a preferred embodiment.

FIG. 2 is a block diagram illustrating an architecture of a preferred embodiment. As noted above, the architecture is embodied in the form of a Web editor 60. The architecture centers around a markup analysis processor (MAP) 61, which is preferably implemented as a high level language, such as C++ or C#. As shown, MAP 61 is preferably integrated into Web editor 60. However, MAP 61 may be a stand-alone module that interfaces with Web editor 60. In general, MAP 61 evaluates a source document 74 against a principal rule set 70 to produce a report document 76. Toward this end, MAP 61 is in communication with an XHTML dynamic link library (DLL) 62 for translating source HTML code to XHTML code. MAP 61 is also in communication with an XML DLL 64 for parsing and otherwise processing the XHTML code and other code compatible with XML standards.

MAP 61 expands the capabilities of previous versions of the Web editor. Correspondingly, MAP 61 is in communication with a Web page editing module 65. In addition to previous capabilities, Web page editing module 65 includes a graphical user interface menu function that a user may select to invoke MAP 61. To render repair user interfaces embedded in report document 76, and to otherwise process markup documents, Web page editing module 65 is in communication with a browser core 66. Similarly, Web page editing module 65 is in communication with a scripting run-time 68 that is provided for processing repair script code embedded in report document 76 and other markup documents. Those skilled in the art will recognize that scripting run-time 68 may be incorporated into browser core 66, or directly accessible by browser core 66.

MAP 61 identifies nonconformances using principal rule set 70 (sometimes referred to as simply the rule set). Preferably, principal rule set 70 comprises an XML document that includes contextual rules defined with a namespace of element types that comprise an XML Patterns (XMLP) specification. An XMLP specification describing XMLP tags and attributes is provided as Appendix A. In this context, principal rule set 70 is sometimes referred to simply as an XMLP document. Similarly, MAP 61 is sometimes referred to as an XMLP processor. Principal rule set 70 may be permanently integrated with the above modules comprising Web editor 60. For example, a rule set defining the WCAG is preferably permanently integrated into Web editor 60, because such a rule set is likely to be widely used. Alternatively, principal rule set 70 may comprise a set of contextual rules that are used by a small group of people or by an individual. Such narrow rule sets may be separate from Web editor 60 and imported or otherwise accessed as input to Web editor 60.

Principal rule set 70 may also access supplemental rule sets 71 that provide additional, or optional, contextual guidelines. One or more supplemental rule sets are preferably accessed via an include tag defined by the XMLP specification. Principal rule set 70 may further access rule set interface templates 72, which provide repair dialog boxes, and other information for repairs and reports. Rule set interface templates 72 preferably comprise DHTML and/or script code for the dialog boxes and repairs. As indicated above, principal rule set 70 is used by MAP 61 to evaluate source document 74 for conformance to specific guidelines and check points in this application of the present invention. Nonconformances and repair information determined by MAP 61 are preferably listed in report document 76.

Figure 3:
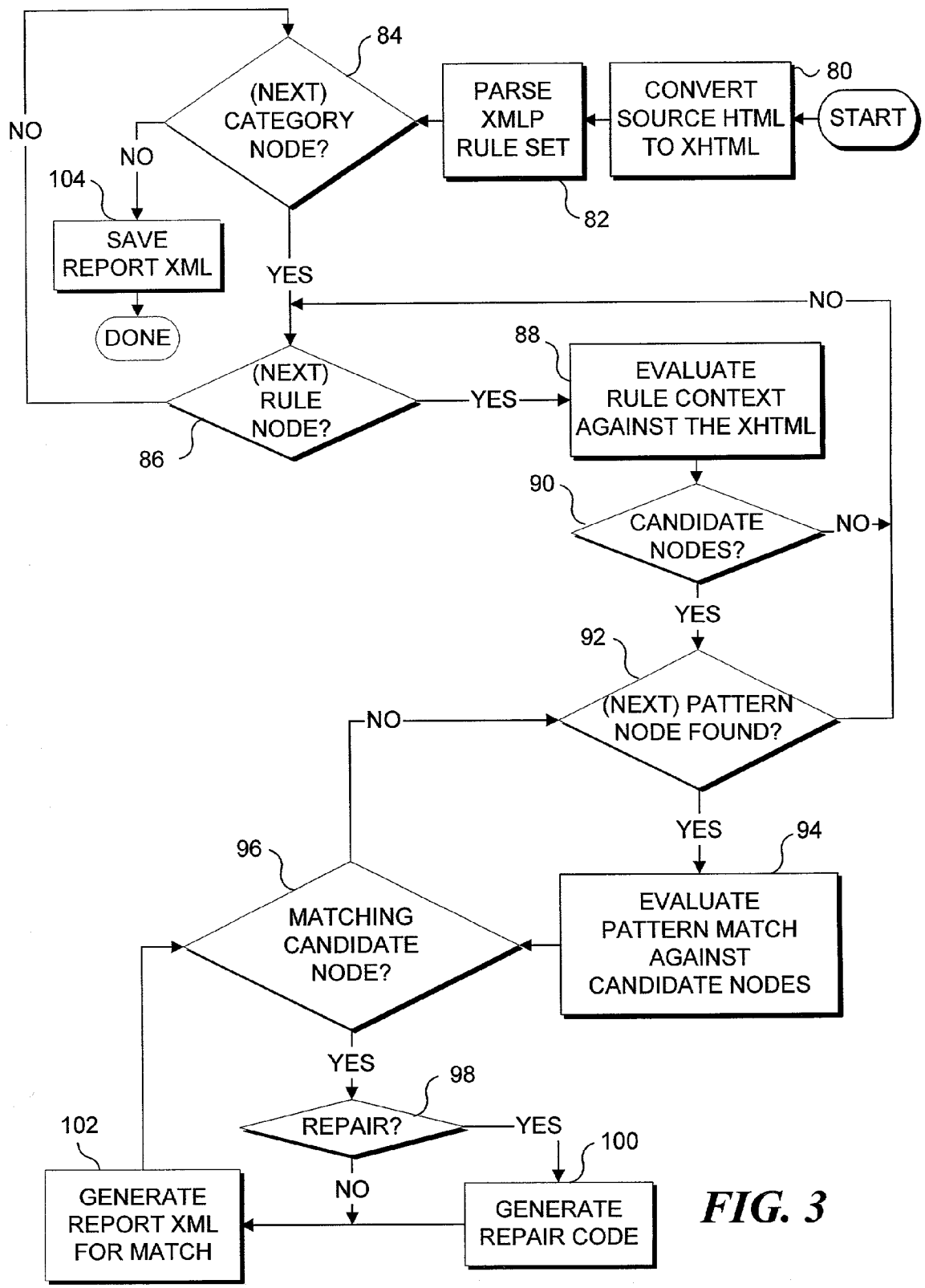
FIG. 3 is a flow diagram illustrating overall logic for evaluating a source document for conformance with a rule set.

FIG. 3 is a flow diagram illustrating the overall logic for evaluating a source document for conformance with a rule set. At a step 80, the MAP accesses an HTML source document and converts the HTML source document to an XHTML document. The MAP utilizes the XHTML DLL to convert the source HTML into XHTML. Although the HTML could be evaluated with custom pattern matching code, XHTML is preferred to facilitate the use of XPath for pattern matching. Further detail regarding step 80 is described below, with regard to FIG. 4.

At a step 82 of FIG. 3, the MAP accesses and parses an XMLP rule set utilizing the XML DLL. The XMLP rule set preferably comprises a collection of category nodes, rule nodes, and pattern nodes. Category nodes simply group one or more related rule nodes. A rule node first defines a characteristic that the MAP should attempt to find in the source document. The MAP searches the source document for source nodes that match the characteristic. Matching source nodes are candidates for further evaluation of conformance with the contextual guidelines defined by the XMLP rule set. A rule node's characteristic is referred to as a context. The context is preferably implemented as an attribute of the rule node. Thus, a rule node first defines a context for which to search in the source document. Preferably, the context comprises an XPath expression that can be matched against any corresponding expression in the source document. Alternatively, the context may comprise an XSL Pattern of an XSLT pattern matching language, or an expression of another pattern matching language. Specifically then, a rule node first defines an XPath expression that is evaluated against the source document to identify candidate source nodes that require further evaluation to determine if the candidate source nodes conform to the contextual guidelines defined by the XMLP rule set.

Identifying candidate source nodes is more efficient than repeatedly evaluating every node of a source document for conformance to each contextual guideline. The actual contextual guidelines are preferably implemented via one or more pattern nodes that are descendant nodes within rule nodes. Further enhancing the efficiency of this hierarchical structure of rule nodes and pattern node, multiple pattern nodes in a rule node enable a rule node to define complex and/or multiple conformance requirements that comprise one or more contextual guidelines. For example, an abstract guideline can be broken down into component patterns that represent the abstract guideline.

To begin the process of finding and evaluating candidate source nodes of the XHTML source document, the MAP determines, at a decision step 84, whether the parsed XMLP rule set includes a category node. If the XMLP rule set includes a category node, the MAP determines, at a decision step 86, whether the category node of the XMLP rule set includes a rule node. In most cases, a category node will include at least one rule node, unless the category node is only used as a place holder, reserved for later user, or otherwise inactive. If the category node does not include any rule nodes, or all rule nodes of the category node have been processed, control returns to decision step 84 to determine if the XMLP rule set includes another category node. However, if the category node includes an unprocessed rule node, the MAP copies the rule context of the rule node to the XML DLL. The XML DLL evaluates the rule context against the XHTML source document, at a step 88. As indicated above, the rule context is preferably an XPath expression that defines a characteristic for identifying one or more candidate source nodes of the XHTML source document.

At a decision step 90, the MAP determines whether the XML DLL returned any candidate source nodes from the XHTML source document that match the XPath expression (i.e., match the rule context) of the rule node. If no match was found, control returns to decision step 86 to determine whether another rule node exists within the current category node. However, if one or more candidate source nodes are found, the MAP determines, as a decision step 92, whether the corresponding rule node includes an unprocessed pattern node. This is a check used primarily on subsequent iterations of processing multiple pattern nodes. If all pattern nodes of the rule node have been processed, control returns to decision step 86 to determine whether another rule node must be processed within the category node. However, if the rule node includes an unprocessed pattern node, the MAP copies a pattern match attribute of the pattern node to the XML DLL. The XML DLL is utilized to evaluate the pattern match attribute against the candidate source node(s) of the XHTML source document, at a step 94. The pattern match attribute represents a contextual guideline to which the candidate source node(s) must conform in order for the source document to conform to the rule set. Preferably, the pattern match attribute comprises an XPath expression, XSL Pattern, or an expression of another pattern matching language. Also preferably, the pattern match attribute comprises a negative expression of the contextual guideline. In other words, if a candidate source node matches the pattern match attribute (i.e., matches the XPath expression of the pattern node), the candidate source node is interpreted as not conforming to that particular contextual guideline of the rule set. Based on this logic, the MAP determines, at a decision step 96, whether a pattern match (e.g., a nonconformance) was found. Those skilled in the art will recognize that the logic could be reversed, such that a match between an inverse of the pattern match attribute and the candidate source node(s) could be interpreted as a conformance.

If a pattern match (e.g., a nonconformance) was not found among any of the candidate source nodes, control returns to decision step 92 to determine if the rule node includes another unprocessed pattern node. However, if a pattern match was detected, the MAP determines, at a decision step 98, whether a repair is available for the nonconformance. Preferably, the MAP checks for the availability of a repair node within the pattern node. If a repair node exists within the current pattern node, the MAP utilizes the repair node to generate repair code in an output report document, at a step 100. The repair node preferably includes script variables that are used to generate DHTML in the output report document, or in a repair DHTML document that is referenced from the output report document. The DHTML provides script code to effect the repair. The DHTML may further provide a link to user interface information for a dialog box that enables a user to control the repair. The user interface information is preferably stored in a rule set user interface template associated with the pattern match. Further detail regarding the repair process is described below with regard to FIGS. 5 and 6. In general, the user can effect repairs by invoking the output report document. This is provides a mechanical process for repairing a nonconforming document. Alternatively, a program module can process the output report document to effect the repairs. Those skilled in the art will recognize that repairs may instead be implemented immediately upon processing a repair node, thereby providing an automatic repair process.

Subsequent to processing a repair node, or if no repair is available, the MAP generates a report in the output report document in XML format corresponding to the pattern match, at a step 102. Preferably, the report comprises a summary of the nonconformance and a text message providing further detail of the problem and suggests methods to repair the nonconformance. The summary and detailed message are preferably nodes defined in, or referenced by, the pattern node of the rule set. Each of these nodes includes a selection value (e.g., another XPath expression) that is evaluated to identify the particular summary or particular detailed message text to include in the output report. The summary text and/or detailed message text may be included in the corresponding summary node and/or message node. Preferably, however, the summary node and/or message node each provide a corresponding identifier that points to a location at which the summary text and message text are stored.

Control then returns to decision step 96 to determine if any other nonconforming candidate nodes were detected as a result of evaluating the pattern match attribute. If another nonconforming candidate node still remains to be processed, it is evaluated and processed with regard to the current pattern node as described above. Once all nonconforming candidate nodes are processed, control returns to decision step 92. After all pattern nodes of the rule node are processed, control returns to decision step 86, and after all rule nodes of a category have been processed, control returns to decision step 84. Finally, once all categories have been processed, the MAP saves the output report document in XML format, at a step 104. As suggested above, the report document may be sent to an output stream for the user to review in the Web editor or other browser, for the user to mechanically implement repairs, or for the Web editor or other module to automatically implement repairs.

To better understand the fundamental processes of evaluating a source document against a rule set, an example is described below. For clarity of the example, the resulting output report document contains only nonconformance messages, without any corresponding repair code. Substantial detail regarding repair code is provided below with regard to FIGS. 5 and 6. Consider the following simple HTML source document.

```
<html>
    <head>
        <title>Bad HTML</title>
    </head>
    <body>
        <img src="image1.gif"></img>
        <frameset>
            <frame src="frame1.htm" />
        </framset>
        <table>
            <tr>
                <td>Item 1</td>
                <td>Item 2</td>
            </tr>
        </table>
    </body>
</html>
```

The above HTML source document is evaluated according to following sample rule set. This sample rule set defines a subset of WCAGs to which the source document must conform:

```
<?xml version="1.0"?>
<!--
    Web Accessibility Initiative (WAI)/Section 508 Compliance
rule set.
    Copyright © 2001, Microsoft Corporation, All rights
reserved.
-->
<xp:ruleset
version="1.0"
xmlns:xp="http://schemas.microsoft.com/2001/xmlpatterns">
    <!-- INCLUDE SECTION -->
    <xp:include src="WAI_strings.xml"/>
    <!-- PRIORITY SECTION: 1 -->
    <!--- CATEGORY: 1.1 -->
    <xp:category name="$Checkpoint1_1">
        <xp:rule context="(//img)">
            <!-- following tests: no "alt" AND no
                longdesc -->
            <xp:pattern
                        match="@alt | @longdesc"
                        is-assert="true"
                        priority="1">
                <xp:report type="error">
                    <xp:message>
                        <xp:value-of
                        select="$error1"/>
                    </xp:message>
                </xp:report>
            </xp:pattern>
        </xp:rule>
    </xp:category>
    <!-- CATEGORY: 5.1 -->
    <xp:category name="$Checkpoint5_1">
        <xp:rule context="//table">
            <xp:pattern
                        match=".//th"
                        is-assert="true"
                        priority="1">
                <xp:report type="warning">
                    <xp:message>
                        <xp:value-of
                        select="$error2"/>
                    </xp:message>
                </xp:report>
            </xp:pattern>
        </xp:rule>
    </xp:category>
    <!-- CATEGORY: 12.1 -->
    <xp:category name="$Checkpoint12_1">
        <xp:rule context="//frame | //frameset |
            //noframes">
            <xp:pattern
                        match="@title"
                        is-assert="true"
                        priority="1">
                <xp:report type="error">
                    <xp:message>
                        <xp:value-of
                        select="$error3"/>
                    </xp:message>
                </xp:report>
            </xp:pattern>
        </xp:rule>
    </xp:category>
</xp:ruleset>
```

Inspection of the above code reveals, for example, that a category named Checkpoint1_1 includes a rule that identifies candidate source nodes as those that include an image. Within each candidate source node, the rule set instructs the MAP to determine whether each candidate source node includes an alternative text attribute or a long description attribute. The "is-assert" attribute enables inverse matching logic, such that if a candidate source node does not include an alternative text attribute or a long description attribute, the source document does not conform to this first contextual guideline of the WCAG. In that event, the rule set instructs the MAP to retrieve and add a nonconformance string to an output report document. The <value-of > element identifies the specific tag name of the nonconforming node, so that the nonconformance string provides a detailed report. As a result of applying the process described above to the entire sample HTML source document, the following report document of nonconformances is produced.

```
<?xml version="1.0"?>
  <report>
    <matches>
    <match type="error">
      <position line="7"/>
      <category>WAI Checkpoint 1.1</category>
      <message>
        The <img> tag is missing a text equivalent
        (either an "alt" or "longdesc" attribute). Alt-
        text should convey the same information the
        image conveys.
      </message>
    </match>
    <match type="warning">
      <position line="13"/>
      <category>WAI Checkpoint 5.1</category>
      <message>
        If this is a data table, please provide header
        rows and/or columns using <th>.
      </message>
    </match>
    <match type="error">
      <position line="9"/>
      <category>WAI Checkpoint 12.1</category>
      <message>
        The <frameset> tag is missing a 'title'
        attribute.
      <message>
    </match>
    <match type="error">
      <position line="10"/>
      <category>WAI Checkpoint 12.1</category>
      <message>
        The <frame> tag is missing a 'title'
        attribute.
      </message>
    </match>
   </matches>
  </report>
```

Figure 4:
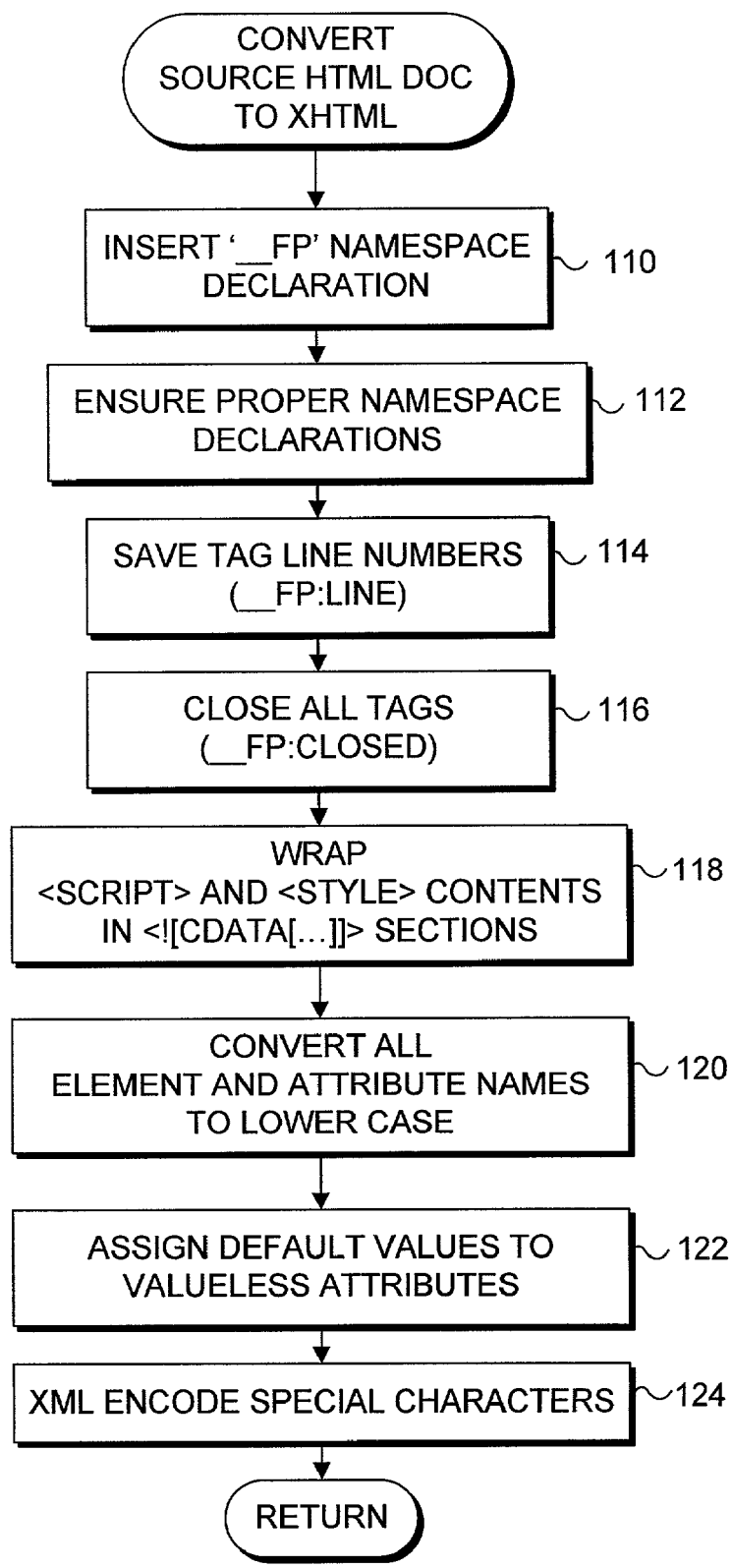
FIG. 4 is a flow diagram illustrating logic for converting an HTML source document into XHTML.

Now, further details regarding the above fundamental process are provided. To begin, FIG. 4 is a flow diagram illustrating logic for converting the HTML source document into XHTML. At a step 110, the MAP utilizes the XHTML DLL to insert namespace declarations appropriate for the Web editor. The inserted namespace declarations enable access to element types available from the Web editor. For example, an "_f" namespace declaration prefix identifies various "_fp:*" element types discussed below. The element types provide capabilities such as maintaining meta data of the HTML source document that may be used for mapping from the resulting output report document back to the HTML source document. At a step 112, the MAP ensures that other namespace declarations in the HTML source document conform to XHTML standards. At a step 114, the MAP saves line numbers of HTML tags in the source document, to provide the output report document with a map from the XHTML back to desired HTML tags. Specifically, the MAP adds an "_fp:line" attribute to each start tag and assigns the line number of each start tag as the value of the corresponding "_fp:line" attribute. At a step 116, the MAP closes all open HTML tags by inserting an appropriate close tag at the end of an HTML node that is opened by the corresponding HTML tag of the source document. In practice, the MAP adds an "_fp:closed" attribute to each start tag. The value of the "_fp:closed" attribute is set to "true" if the element was originally closed and set to "false" otherwise.

At a step 118, the MAP identifies and wraps any script and style contents in character data (CDATA) sections. For example, the MAP identifies any <script and <style>nodes, and encloses these nodes in <![CDATA[ . . . ]]>tags. The XML parser of the XHTML DLL will ignore the contents of the source document wrapped within the CDATA sections. Thus, the XML parser will simply pass these contents through to the resulting XHTML document. If such contents of the source document are already wrapped in comment tags, the comment tags are first removed before the CDATA tags are applied.

The MAP then converts all element and attribute names to lower case, at a step 120. The original tag name will be stored in an "_fp:tag" attribute. Similarly, original attribute names are stored in an "_fp:<attribute name>" attribute. At a step 122, the MAP assigns default values to attributes that do not have a value assigned. The default value for a valueless attribute is the name of the attribute itself Finally, at a step 124, the MAP encodes special characters in XML format, such as >, <, and &. This encoding is done both in text nodes and in attribute values. Control then returns to a control module of the MAP.

Figure 5:
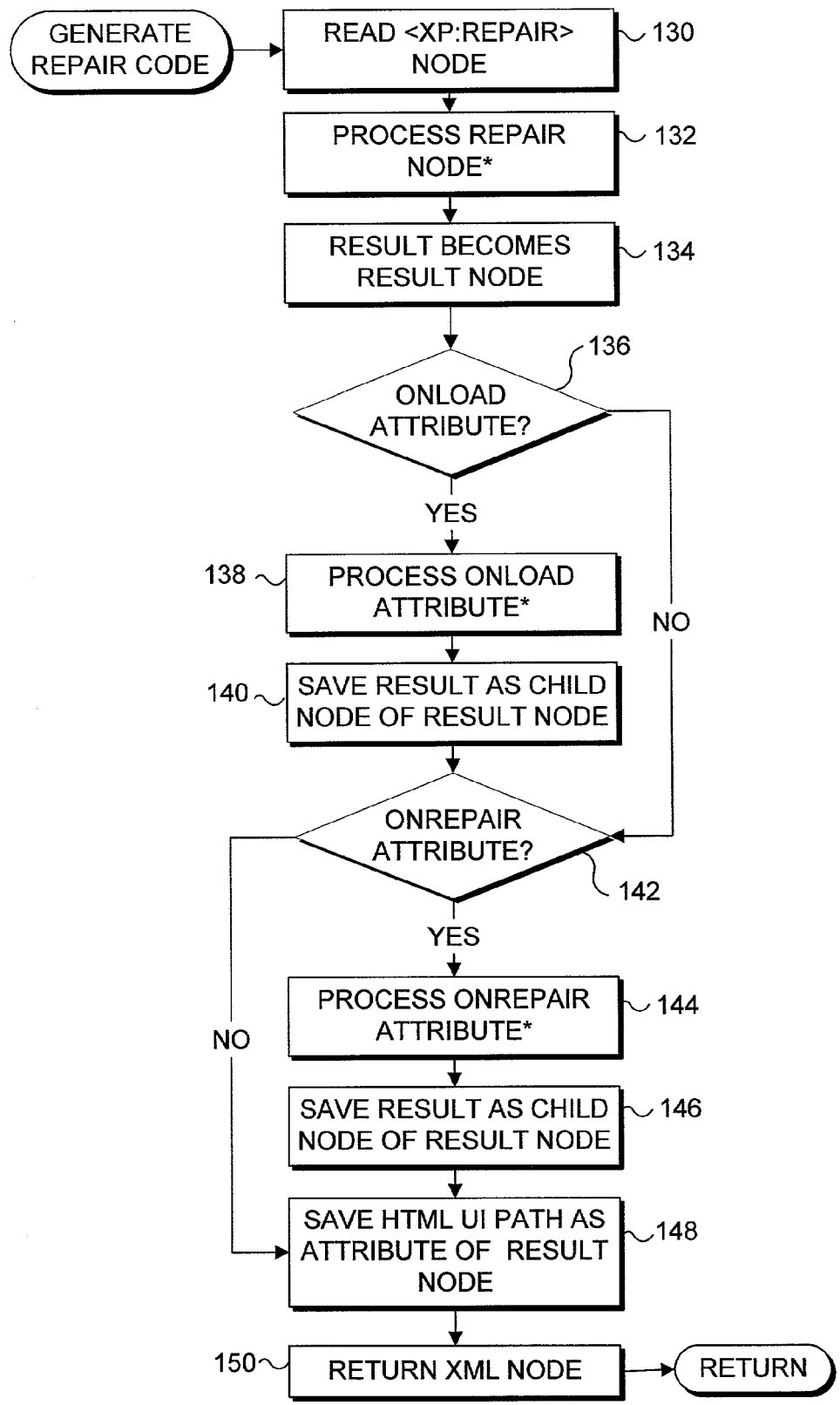
FIG. 5 is a flow diagram illustrating logic for generating Dynamic Hypertext Markup Language (DHTML) for a repair node.

FIG. 5 is a flow diagram illustrating logic for generating DHTML for a repair node. At a step 130, the MAP reads a repair node from within the current pattern node of the XMLP rule set document. Specifically, the MAP detects an <xp:repair>tag, and reads its corresponding attributes and other elements, as defined by the XMLP specification provided in Appendix A. A repair node may include an onload attribute that encloses preliminary actions to be performed immediately before loading and displaying a repair user interface (e.g., a repair dialog box). Preferably, the preliminary actions include scripting that will be appended to the end of an onload event handler of a repair DHTML document. A repair node may further include an onrepair attribute that encloses actual repair actions to be performed immediately after the user confirms that the repair should be performed. Such confirmation may be indicated by clicking on a button, such as a "repair" or "OK" button. Similar to the preliminary actions, the repair actions preferably include scripting that will be appended to the end of an onrepair event handler of the repair DHTML document.

Having read a repair node, the MAP converts script variables of the repair node, at a step 132, into ECMAScript expressions that can be inserted into the repair DHTML document. The conversion process is described below with respect to FIG. 6. At a step 134 of FIG. 5, the result of the conversion process becomes a converted repair node. At a decision step 136, the MAP determines whether the converted repair node includes an onload attribute (e.g., an <xp:onload>attribute). If the converted repair node includes an onload attribute, the MAP converts script variables of the onload attribute, at a step 138. The MAP uses the same conversion process described below in FIG. 6, but uses script variables and other information from the onload attribute. At a step 140 of FIG. 5, the MAP saves the result of the conversion process as a child node of the above converted repair node.

Once the onload attribute is converted, or if no onload attribute exists in the converted repair node, the MAP determines, at a decision step 142, whether the converted repair node includes an onrepair attribute. If the converted repair node includes an onrepair attribute, the MAP converts script variables of the onrepair attribute, at a step 144. As indicated above, the MAP uses the same conversion process described below in FIG. 6, but uses script variables and other information from the onrepair attribute. At a step 146 of FIG. 5, the MAP saves the result of the conversion process as a child node of the above converted repair node. Once the onrepair attribute is converted, or if no onrepair attribute exists in the converted repair node, the MAP saves an HTML user interface path corresponding to the converted repair node, at a step 148. The user interface path is saved as an attribute of the converted repair node. At a step 150, the MAP returns the completely converted repair node to a control module for later insertion into the repair DHTML.

Figure 6:
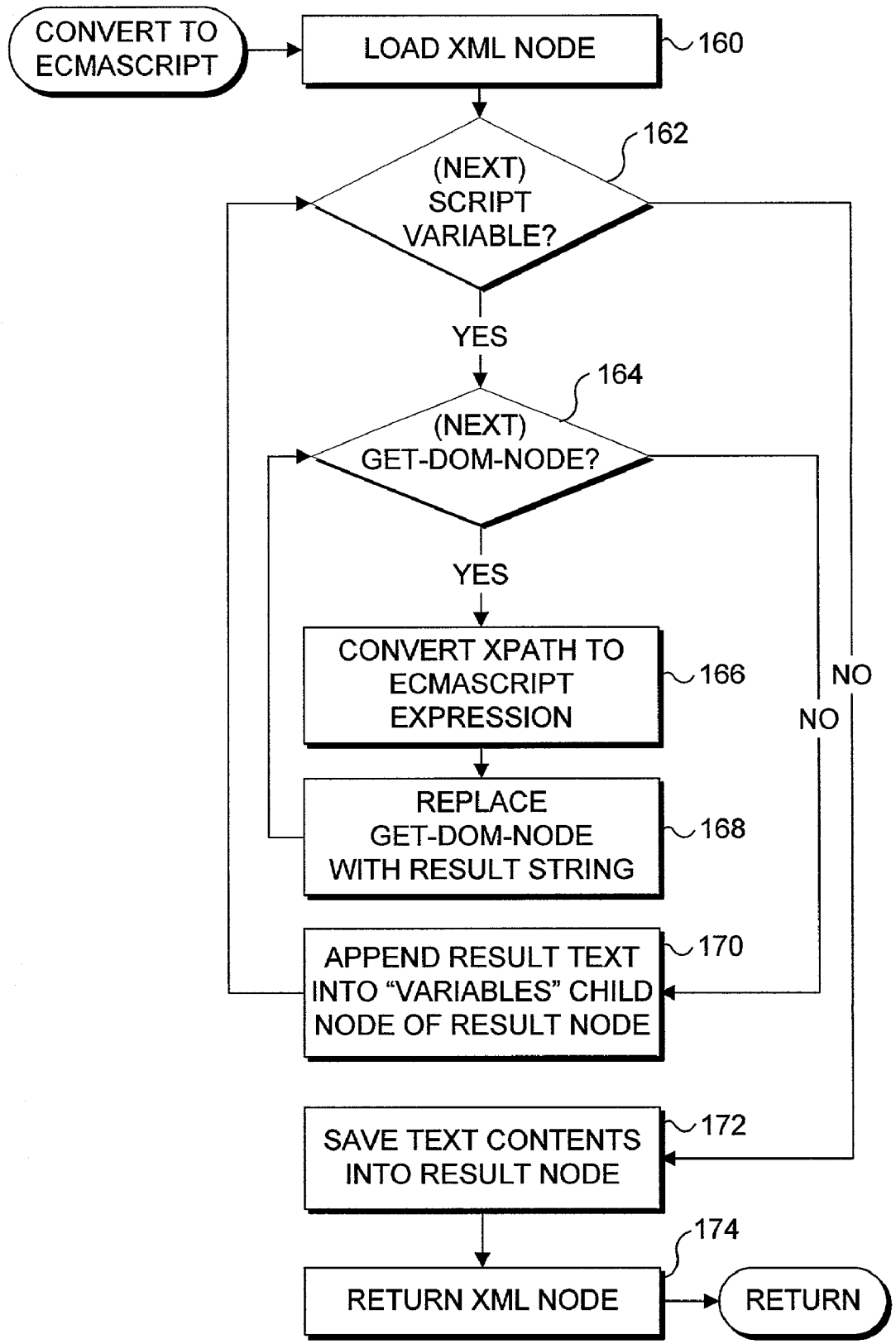
FIG. 6 is a flow diagram illustrating logic for converting script variables of a node to European Computer Manufacturers Association script (ECMAScript).

FIG. 6 is a flow diagram illustrating logic for converting script variables of a node to ECMASCRIPT. At a step 160, the MAP loads the node to be converted. Since the node is part of the XMLP rule set, which conforms to XML standards, the loaded node is referred to as an XML node. At a decision step 162, the MAP determines whether the XML node includes a script variable node. Specifically, the MAP checks the XML node for an <xp:scriptvariable>tag and its corresponding attributes and elements, as defined by the XMLP specification provided in Appendix A. If a script variable node exists, the MAP determines, at a decision step 164, whether the script variable node includes a node to get a Document Object Module (DOM) node. Specifically, the MAP checks for an <xp:get-dom-node>tag and its corresponding attributes and elements, as defined by the XMLP specification provided in Appendix A. The get-dom-node translates itself into an ECMAScript DOM function call. Specifically, the get-dom-node evaluates its own XPath expression (or XSLT pattern) to retrieve a node in the XHTML source document, and maps that XHTML node to the original node of the HTML source document. The get-dom-node then translates itself into an ECMAScript call that maps to the original node of the HTML source document. The get-dom-node must include a "select" attribute, whose value is an XPath expression (or XSLT pattern) that is matched against the source document with relation to a parent pattern node. If the script variable node includes a get-dom-node, the MAP converts the XPath expression (or XSLT pattern) to an ECMASCRIPT expression, at a step 166. At a step 168, the MAP replaces the get-dom-node with a string comprising the ECMASCRIPT expression. Control then returns to decision step 164 to process any other get-dom-node in the script variable node.

After every get-dom-node of the current script variable node has been converted, at a step 170, the MAP appends the converted string(s) to a child node of the resulting converted node, called a "variables" child node. Control then returns to decision step 162 to process another script variable node. When every script variable node of the current XML node is fully converted, the MAP saves the text contents of the variables child node into the now converted XML node, at a step 172. At a step 174, the MAP returns the converted XML node. Control then returns to a controlling module of the MAP for further processing of the converted XML node, according to the logic of FIG. 5.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A computer implemented method for evaluating a source document for compliance with a rule set that represents a set of contextual guidelines to which the source document must conform, comprising:

parsing the rule set for rule node, wherein the rule node provides a context value for identifying in the source document a set of source nodes that should be evaluated for conformance to the contextual guidelines;

evaluating the context value of the rule node in relation to the source document to identify in the source document the set of nodes that should be evaluated for conformance to the contextual guidelines;

parsing the rule node for a pattern node, wherein the pattern node includes a pattern matching expression and is a descendent of the rule node, and wherein the pattern node represents one of the set of contextual guidelines to which the source document must conform;

evaluating the pattern matching expression of the pattern node to determine whether a match exists between the pattern matching expression and at least one source node;

if a match exists, generating a repair document including computer code that is executed to repair a nonconformance between the at least one source node and the pattern node, if the at least one source node does not conform to the pattern node;

parsing the pattern node for a repair node, wherein the repair node includes a summary node for summarizing the nonconformance and a detail message node to provide further detail of the nonconformance;

evaluating a selection value of the summary node to determine a summary expression and the detail message node to determine a detail expression, wherein the summary expression and the detail expression each comprises an XPath expression;

evaluating the expression with information from the at least one source node to identify a particular summary message text and evaluating the detail expression with information about the at least one source node to identify a particular detail message text; and one step selected from the group steps consisting of:
  storing the summary message text and the detail message text in a report document; and
  displaying the summary message text and the detail message text.

2. The method of claim 1, wherein the source document is a Hypertext Markup Language (HTML) document.

3. The method of claim 2, further comprising the steps of:
(a) converting the source document into an extensible HTML (XHTML) document; and
(b) replacing the HTML document with the XHTML document as the source document.

4. The method of claim 1, wherein the rule set is an extensible Markup Language (XML) document.

5. The method of claim 1, wherein the context value is an XPath expression conforming to XPath standards defined by one of a World Wide Web Consortium and a Section 508 of an Americans with Disabilities Act that were each in effect on Jun. 17, 2002.

6. The method of claim 1, wherein the context value is an extensible stylesheet transformations expression.

7. The method of claim 1, wherein the pattern matching expression is one of an XPath expression and an extensible stylesheet transformations expression conforming to standards defined by a World Wide Web Consortium and in effect on Jun. 17, 2002.

8. The method of claim 1, wherein the contextual guidelines include non-grammatical guidelines.

9. The method of claim 1, further comprising identifying a specific tag corresponding to the nonconformance.

10. The method of claim 1, wherein generating a repair document including computer code enabled to repair a nonconformance, comprises:
   parsing the pattern node for repair node, wherein the repair node identifies a script function to modify the source document to conform to the one of the set of contextual guidelines; and
   one stage selected from the group consisting of:
      storing the script function in the repair document that can be utilized to later modify the source document to conform to the one of the set of contextual guidelines; and
      invoking the script function to modify the source document to conform to the one of the set of contextual guidelines.

11. The method of claim 1, wherein the rule set represents one of Web Content Accessibility Guidelines and guidelines defined by Section 508 of an Americans with Disabilities Act that were each in effect on Jun. 17, 2002.

12. A memory medium on which are provided machine instructions for carrying out the steps of claim 1.

13. A system for evaluating a source document for compliance with a rule set that represents a set of contextual guidelines to which the source document must conform, comprising:
   a memory in which are stored machine instructions; and
   a processor that is coupled to the memory, said processor executing the machine instructions, which cause the processor to carry out a plurality of functions, including:
      parsing the rule set for rule node, wherein the rule node provides a context value for identifying in the source document, a set of source nodes that should be evaluated for conformance to the contextual guidelines;
      evaluating the context value of the rule node in relation to the source document to identify in the source document the set of nodes that should be evaluated for conformance to the contextual guidelines;
      parsing the rule node for a pattern node, wherein the pattern node includes a pattern matching expression and is a descendent of the rule node, and wherein the pattern node represents one of the set of contextual guidelines to which the source document must conform;
      evaluating the pattern matching expression of the pattern node to determine whether a match exists between the pattern matching expression and at least one source node;
      if a match exists, generating a repair document that includes computer code, which when executed, causes the processor to repair a nonconformance between the at least one source node and the pattern node, if the at least one source node does not conform to the pattern node;
      parsing the pattern node for a repair node, wherein the repair node includes a summary node for summarizing the nonconformance and a detail message node to provide further detail of the nonconformance;
      evaluating a selection value of the summary node to determine a summary expression and the detail message node to determine a detail expression, wherein the summary expression and the detail expression each comprises an XPath expression;
      evaluating the expression with information from the at least one source node to identify a particular summary message text and evaluating the detail expression with information about the at least one source node to identify a particular detail message text; and
   one function selected from the group functions consisting of:
      storing the summary message text and the detail message text in a report document; and
      displaying the summary message text and the detail message text.

14. The system of claim 13, wherein the plurality of functions further include reporting the nonconformance.

15. The system of claim 13, wherein the source document is a Hypertext Markup Language (HTML) document.

16. The system of claim 13, wherein the machine instructions further cause the processor to carry out the functions of:
   (a) converting the source document into an extensible HTML (XHTML) document; and
   (b) replacing the HTML document with the XHTML document as the source document.

17. The system of claim 13, wherein the rule set is an extensible Markup Language (XML) document.

18. The system of claim 13, wherein the context value is an XPath expression conforming to XPath standards defined by a World Wide Web Consortium and in effect on Jun. 17, 2002.

19. The system of claim 13, wherein the context value is an extensible stylesheet transformations expression.

20. The system of claim 13, wherein the pattern matching expression is one of an XPath expression and an extensible stylesheet transformations expressing conforming to standards defined by a World Wide Web Consortium and in effect on Jun. 17, 2002.

21. The system of claim 13, wherein the machine instructions further cause the processor to carry out the functions of:
   parsing the pattern node for repair node, wherein the repair node includes at least one of a summary node for summarizing the nonconformance and a message node for identifying a message;
   evaluating a selection value of the at least one of the summary node to determine a summary identifier and the message node to determine a message identifier;
   accessing at least one of a summary text corresponding to the summary identifier and a message text corresponding to the message identifier; and
   one of:
      storing at least one of the summary text and the message text in the report document; and
      displaying at lest one of the summary text and the message text.

22. The system of claim 21, wherein the machine instructions further cause the processor to carry out the functions of identifying a specific tag corresponding to the nonconformance.

23. The system of claim 13, wherein the machine instructions further cause the processor to carry out the functions of:
  parsing the pattern node for repair node, wherein the repair node identifies a script function to modify the source document to conform to the one of the set of contextual guidelines; and
  implementing one function selected from the group of functions consisting of:
    storing the script function in the repair document that can be utilized to later modify the source document to conform to the one of the set of contextual guidelines; and
    invoking the script function to modify the source document to conform to the one of the set of contextual guidelines.

24. The system of claim 13, wherein the rule set represents Web Content Accessibility Guidelines that were each in effect on Jun. 17, 2002.

* * * * *